(12) United States Patent
Choi et al.

(10) Patent No.: US 9,134,568 B2
(45) Date of Patent: Sep. 15, 2015

(54) VARIFOCAL LENS

(71) Applicant: SAMSUNG ELECTRONICS CO., LTD., Suwon-si (KR)

(72) Inventors: Byoung-lyong Choi, Yongin-si (KR); Eun-kyung Lee, Yongin-si (KR); Seung-nam Cha, Yongin-si (KR); Seung-wan Lee, Yongin-si (KR); Sun-il Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 215 days.

(21) Appl. No.: 13/719,299

(22) Filed: Dec. 19, 2012

(65) Prior Publication Data

US 2013/0201436 A1 Aug. 8, 2013

(30) Foreign Application Priority Data

Feb. 7, 2012 (KR) ........................ 10-2012-0012535

(51) Int. Cl.
*G02F 1/13* (2006.01)
*G02F 1/1335* (2006.01)
*G02F 1/29* (2006.01)

(52) U.S. Cl.
CPC ............ *G02F 1/133526* (2013.01); *G02F 1/29* (2013.01); *G02F 2001/294* (2013.01)

(58) Field of Classification Search
CPC   G06F 2001/294; G06F 1/29; G06F 1/133526
USPC ............... 349/193, 74, 57, 95, 200, 201, 202; 359/665, 666, 667
See application file for complete search history.

(56) References Cited

U.S. PATENT DOCUMENTS

| | | | | |
|---|---|---|---|---|
| 5,416,757 A * | 5/1995 | Luecke et al. | ............. | 369/44.23 |
| 5,493,427 A * | 2/1996 | Nomura et al. | .................... | 349/5 |
| 6,219,113 B1 * | 4/2001 | Takahara | ......................... | 349/42 |
| 7,295,265 B2 * | 11/2007 | Oh et al. | ......................... | 349/74 |
| 7,420,237 B2 | 9/2008 | Nagano et al. | | |
| 7,475,985 B2 | 1/2009 | Blum et al. | | |
| 7,847,895 B2 * | 12/2010 | Chen et al. | .................... | 349/114 |
| 7,852,454 B2 | 12/2010 | Border et al. | | |
| 2007/0216851 A1 * | 9/2007 | Matsumoto | .................... | 349/200 |

(Continued)

FOREIGN PATENT DOCUMENTS

KR   1020060127809 A   12/2006
KR   1020090027330 A   3/2009

(Continued)

OTHER PUBLICATIONS

Naumov et al.; Control optimization of spherical modal liquid crystal lenses, Optics Express, Apr. 26, 1999, vol. 4, No. 9, pp. 344-352.

(Continued)

*Primary Examiner* — Sang V Nguyen
(74) *Attorney, Agent, or Firm* — Sughrue Mion, PLLC

(57) ABSTRACT

A varifocal lens including a first liquid crystal layer; a second liquid crystal layer disposed below the first liquid crystal layer; a common electrode disposed between the first liquid crystal layer and the second liquid crystal layer; a first electrode disposed above the first liquid crystal layer and having a curved shape; and a second electrode disposed below the second liquid crystal layer and having a curved shape.

18 Claims, 8 Drawing Sheets

(56) References Cited

U.S. PATENT DOCUMENTS

| | | | |
|---|---|---|---|
| 2009/0010113 A1* | 1/2009 | Kamioka | 369/44.23 |
| 2009/0153504 A1* | 6/2009 | Liu et al. | 345/173 |
| 2009/0168010 A1 | 7/2009 | Vinogradov et al. | |
| 2009/0303419 A1* | 12/2009 | Koma | 349/74 |
| 2010/0001971 A1* | 1/2010 | Jiang et al. | 345/173 |
| 2011/0096250 A1* | 4/2011 | Cha et al. | 349/15 |
| 2011/0109824 A1* | 5/2011 | Galstian | 349/33 |
| 2011/0149410 A1* | 6/2011 | Blum | 359/666 |
| 2012/0154715 A1* | 6/2012 | Kim et al. | 349/84 |
| 2013/0169920 A1* | 7/2013 | Wada | 349/200 |

FOREIGN PATENT DOCUMENTS

| | | |
|---|---|---|
| KR | 1020090058772 A | 6/2009 |
| KR | 1020100061820 A | 6/2010 |

OTHER PUBLICATIONS

Ren et al.; Adaptive liquid crystal lens with large focal length tunability, Optics Express, Nov. 13, 2006, vol. 14, No. 23, pp. 11292-11298.

Wang et al.; Liquid Crystal Lens with Focal Length Variable from Negative to Positive Values, IEEE Photonics Technology Letters, vol. 18, No. 1, Jan. 1, 2006.

Kao et al.; A new low-voltage-driven GRIN liquid crystal lens with multiple ring electrodes in unequal widths, Optics Express, Aug. 30, 2010, vol. 18, No. 18, pp. 18506-18518.

* cited by examiner

VARIFOCAL LENS

CROSS-REFERENCE TO RELATED APPLICATIONS

This application claims priority from Korean Patent Application No. 10-2012-0012535, filed on Feb. 7, 2012, in the Korean Intellectual Property Office, the disclosure of which is incorporated herein in its entirety by reference.

BACKGROUND

1. Field

The present disclosure relates to varifocal lenses.

2. Description of the Related Art

A lens is an instrument for concentrating or distributing light according to properties whereby light is refracted at a boundary surface between different media with different refractive indexes and is a basic component of various imaging devices such as cameras.

A focal length of a lens is determined according to a curvature of a lens surface and a material of a lens. Recently, demand for a lens system having a varifocal function for obtaining better images has increased. A varifocal function is used for an autofocusing operation or a zooming operation and is performed by mechanically moving some lenses constituting a lens system by using a motor or the like or by changing a curvature of a lens surface by using a liquid lens.

Recently, there has been increased interest in techniques for using a liquid crystal as an optical lens by electrically controlling the operation thereof. Liquid crystal molecules are aligned along the direction of an electric field. Since the refractive index in a major axis direction is generally different from the refractive index in a minor axis direction in the case of liquid crystal molecules, the liquid crystal molecules have various refractive indexes according to their alignment states. In particular, if a boundary surface, where the refractive index changes due to the alignment of liquid crystal molecules, is curved, the liquid crystal molecules refract light transmitted thereto, thereby acting as an optical lens.

SUMMARY

Additional aspects will be set forth in part in the description which follows and, in part, will be apparent from the description, or may be learned by practice of the presented embodiments.

According to an aspect of an exemplary embodiment, a varifocal lens includes a first liquid crystal layer; a second liquid crystal layer disposed below the first liquid crystal layer; a common electrode disposed between the first liquid crystal layer and a second liquid crystal layer; a first electrode disposed above the first liquid crystal layer and having a curved shape; and a second electrode disposed below the second liquid crystal layer and having a curved shape.

The varifocal lens may further include a first upper substrate having a curved surface corresponding to an upper surface of the first electrode and disposed above the first liquid crystal layer, wherein the first electrode is disposed on a lower surface of the first upper substrate. In addition, the varifocal lens may further include a second upper substrate that includes a lower surface having a flat shape and an upper surface having a curved surface corresponding to a lower surface of the first electrode and is disposed above the first liquid crystal layer, wherein the first electrode is disposed between the first upper substrate and the second upper substrate.

The varifocal lens may further include a first lower substrate that includes a lower surface having a flat shape and an upper surface having a curved surface corresponding to a lower surface of the second electrode and is disposed below the second liquid crystal layer, wherein the second electrode is disposed on the upper surface of the first lower substrate. In addition, the varifocal lens may further include a second lower substrate that includes an upper surface having a flat shape and a lower surface having a curved surface corresponding to an upper surface of the second electrode, wherein the second electrode is disposed between the first lower substrate and the second lower substrate.

The varifocal lens may further include a first nano structure layer including a plurality of nano structures and disposed between the first electrode and the first liquid crystal layer. In addition, the varifocal lens may further include a second nano structure layer including a plurality of nano structures and disposed between the second electrode and the second liquid crystal layer.

The plurality of nano structures may include any one of carbon nanotube (CNT), metal nanowire, ZnO nanowire, and Si nanowire.

The common electrode may include a plurality of electrodes that are spaced apart from each other and are arranged to have an overall flat structure. For example, the common electrode may have a structure in which a plurality of electrodes each having a fan shape are spaced apart from each other to form a circular shape.

A surface of the first electrode may be concave or convex toward the first liquid crystal layer.

A surface of the second electrode may be concave or convex toward the second liquid crystal layer.

According to another aspect of an exemplary embodiment, a varifocal lens includes a first liquid crystal layer; a common electrode disposed below the first liquid crystal layer; a first electrode disposed above the first liquid crystal layer and having a curved shape; and a first nano structure layer disposed between the first electrode and the first liquid crystal layer and including a plurality of nano structures.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
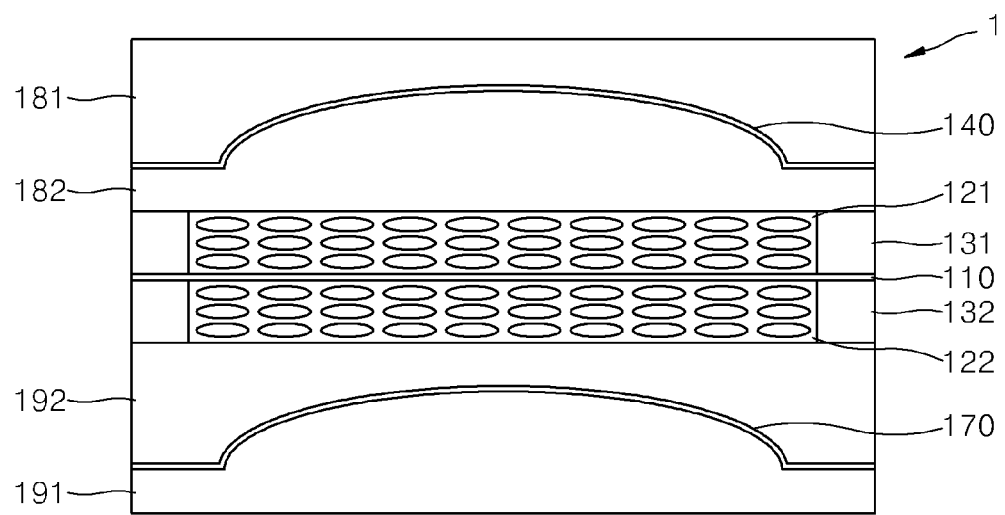
FIG. 1 is a cross-sectional view of a varifocal lens according to an exemplary embodiment.

Reference will now be made in detail to exemplary embodiments, examples of which are illustrated in the accompanying drawings, wherein like reference numerals refer to the like elements throughout. In the drawings, the sizes of elements are exaggerated for clarity and convenience of understanding. Also, the exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

Figure 2A:
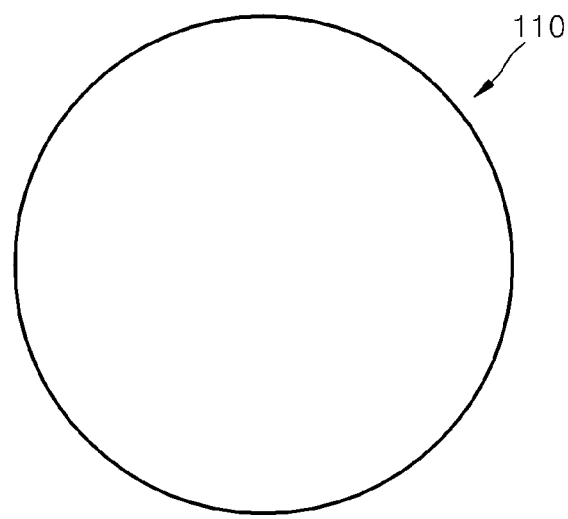
FIGS. 2A and 2B are plan views for explaining exemplary shapes of common electrodes included in the varifocal lens of FIG. 1, according to aspects of exemplary embodiments.
Figure 2B:
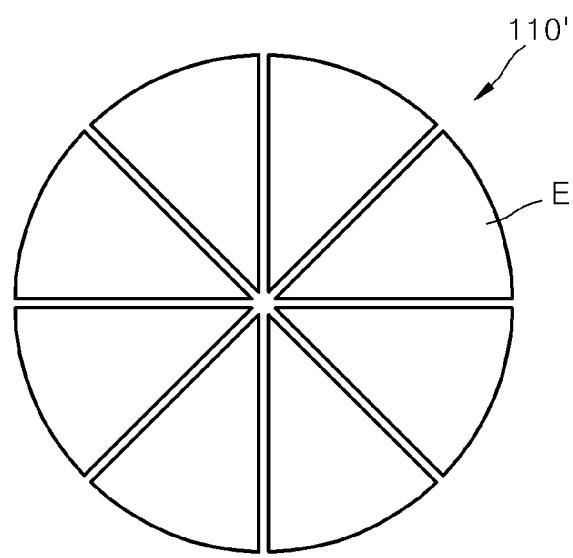

FIG. 1 is a cross-sectional view of a varifocal lens 100 according to an exemplary embodiment. FIGS. 2A and 2B are plan views for explaining exemplary shapes of common electrodes 110 and 110' included in the varifocal lens 100 of FIG. 1, according to aspects of exemplary embodiments.

Referring to FIG. 1, the varifocal lens 100 includes a first liquid crystal layer 121, a second liquid crystal layer 122 disposed below the first liquid crystal layer 121, the common electrode 110 disposed between the first liquid crystal layer 121 and the second liquid crystal layer 122, a first electrode 140 disposed above the first liquid crystal layer 121 and having a curved shape, and a second electrode 170 disposed below the second liquid crystal layer 122 and having a curved shape.

Each of the first liquid crystal layer 121 and the second liquid crystal layer 122 includes a plurality of liquid crystal molecules. When an electric field is formed in each of the first liquid crystal layer 121 and the second liquid crystal layer 122, the liquid crystal molecules are aligned according to a direction of the electric field. The liquid crystal molecules of the first liquid crystal layer 121 are aligned according to an electric field formed by a voltage applied between the common electrode 110 and the first electrode 140. The liquid crystal molecules of the second liquid crystal layer 122 are aligned according to an electric field formed by a voltage applied between the common electrode 110 and the second electrode 170. In this case, the liquid crystal molecules have different refractive indexes of, for example, about 1.53 to about 1.79 according to directions in which the liquid crystal molecules are aligned. If the liquid crystal molecules are aligned in the same direction, a boundary surface at which a refractive index is changed is not formed in each of the first liquid crystal layer 121 and the second liquid crystal layer 122. In addition, in order to constitute such a boundary surface, a non-uniform electric field needs to be formed such that liquid crystal molecules are aligned in different directions according to their positions in each of the first liquid crystal layer 121 and the second liquid crystal layer 122. To this end, the varifocal lens 100 includes the common electrode 110 having a flat shape, the first electrode 140 and the second electrode 170 that are formed to have a predetermined curvature. When a voltage is applied between the common electrode 110 and the first electrode 140, distances between the common electrode 110 and the first electrode 140 are different according to positions of the liquid crystal molecules in the first liquid crystal layer 121. Alignments of the liquid crystal molecules are different according to the positions of the liquid crystal molecules in the first liquid crystal layer 121 such that a relatively strong electric field may be formed at positions where the distance between the common electrode 110 and the first electrode 140 is relatively small and a relatively weak electric field may be formed at positions where the distance is relatively great. Since the refractive indexes of the liquid crystal molecules are different according to alignments of the liquid crystal molecules, a boundary surface at which a refractive index is changed is formed in the first liquid crystal layer 121 to constitute a lens surface. Similarly, when a voltage is applied between the common electrode 110 and the second electrode 170, the lens surface is formed in the second liquid crystal layer 122.

A structure of the varifocal lens 100 will be described in detail with reference to FIGS. 1, 2A, and 2B.

A first upper substrate 181 may be disposed above the first liquid crystal layer 121 and also may be disposed above the first electrode 140. The first upper substrate 181 may have an upper surface having a flat shape and a lower surface having a curved surface corresponding to an upper surface of the first electrode 140. In addition, a second upper substrate 182 may be disposed between the first upper substrate 181 and the first liquid crystal layer 121 and may have a lower surface having a flat shape and an upper surface having a curved surface corresponding to a lower surface of the first electrode 140. The second upper substrate 182 may be disposed below the first electrode 140 and above the first liquid crystal layer 121. The first electrode 140 may be disposed between the first upper substrate 181 and the second upper substrate 182 and may be formed, for example, in the form of film such that the two surfaces of the first electrode 140 may be attached to the lower surface of the first upper substrate 181 and the upper surface of the second upper substrate 182, respectively.

A first lower substrate 191 may be disposed below the second liquid crystal layer 122 and also may be disposed below the second electrode 170. The first lower substrate may have a lower surface having a flat shape and an upper surface having a curved surface corresponding to an upper surface of the second electrode 170. In addition, a second lower substrate 192 may be disposed between the second liquid crystal layer 122 and the first lower substrate 191 and may have an upper surface having a flat shape and a lower surface having a curved surface corresponding to an upper surface of the second electrode 170. The second lower substrate 192 may be disposed above the second electrode 170 and below the second liquid crystal layer 122. The second electrode 170 may be disposed between the first lower substrate 191 and the second lower substrate 192 and may be formed, for example, in the form of film such that the two surfaces of the second electrode 170 may be attached to the upper surface of the first lower substrate 191 and the lower surface of the second lower substrate 192, respectively.

The varifocal lens 100 may further include a first spacer 131 for encapsulating the first liquid crystal layer 121 and a second spacer 132 for encapsulating the second liquid crystal layer 122.

The common electrode 110 may have a disk shape, as shown in FIG. 2A, but is not limited thereto. In addition, the common electrode 110 may be attached to a support membrane (not shown) and may be disposed between the first liquid crystal layer 121 and the second liquid crystal layer 122.

The common electrode 110 may include a single electrode, as shown in FIG. 2A, or alternatively, may include a plurality of electrodes that are arranged to have an overall flat structure.

Referring to FIG. 2B, the common electrode 110' may have a structure in which a plurality of electrodes E each having a fan shape are spaced apart from each other to form a circular shape. The electrodes E may be attached to a support membrane (not shown) and may be disposed between the first liquid crystal layer 121 and the second liquid crystal layer 122. The structure of the common electrode 110' is used to control refractive indexes differently according to regions obtained by dividing the first liquid crystal layer 121 and the second liquid crystal layer 122 and may be used in, for example, a lens for astigmatism.

The first upper substrate 181, the second upper substrate 182, the first lower substrate 191, the second lower substrate 192, the first spacer 131, and the second spacer 132 may be formed of a transparent material, for example, glass or a transparent plastic material.

The common electrode 110, the first electrode 140, and the second electrode 170 may be formed of a transparent electrode material.

The varifocal lens 100 having the above-described structure includes the common electrodes 110 and 110' which are each disposed between the first liquid crystal layer 121 and the second liquid crystal layer 122, and the first electrode 140 and the second electrode 170, wherein voltages are applied between the first electrode 140 and each of the common electrodes 110 and 110' and between the second electrode 170 and each of the common electrodes 110 and 110' so as to independently control the first liquid crystal layer 121 and the second liquid crystal layer 122, thereby obtaining a precise variable focus. If necessary, various focal lengths may be obtained by driving only one of the first liquid crystal layer 121 and the second liquid crystal layer 122 or combining different lens surfaces which are formed by driving both of the first liquid crystal layer 121 and the second liquid crystal layer 122, respectively.

Hereinafter, varifocal lens according to the exemplary embodiments will be described.

Figure 3:
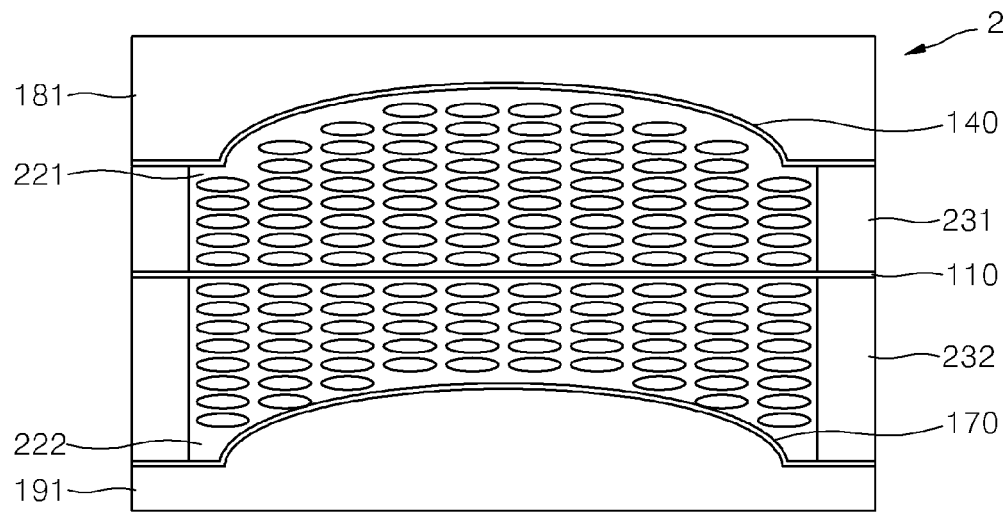
FIG. 3 is a cross-sectional view of a varifocal lens according to another exemplary embodiment.

FIG. 3 is a cross-sectional view of a varifocal lens 2 according to another exemplary embodiment.

The varifocal lens 2 according to the present embodiment is different from the varifocal lens 100 of FIG. 1 in that the varifocal lens 2 does not include a second upper substrate and a second lower substrate. That is, the first electrode 140 is disposed on the lower surface of the first upper substrate 181, the second electrode 170 is disposed on the upper surface of the first lower substrate 191, a first liquid crystal layer 221 is disposed between the first electrode 140 and the common electrode 110, and a second liquid crystal layer 222 is disposed between the common electrode 110 and the second electrode 170. The varifocal lens 2 may further include a first spacer 231 for encapsulating the first liquid crystal layer 221 and a second spacer 232 for encapsulating the second liquid crystal layer 222.

The varifocal lens 100 of FIG. 1 or the varifocal lens 2 of FIG. 3 may be selectively used for the convenience of manufacturing processes, for example.

Figure 4:
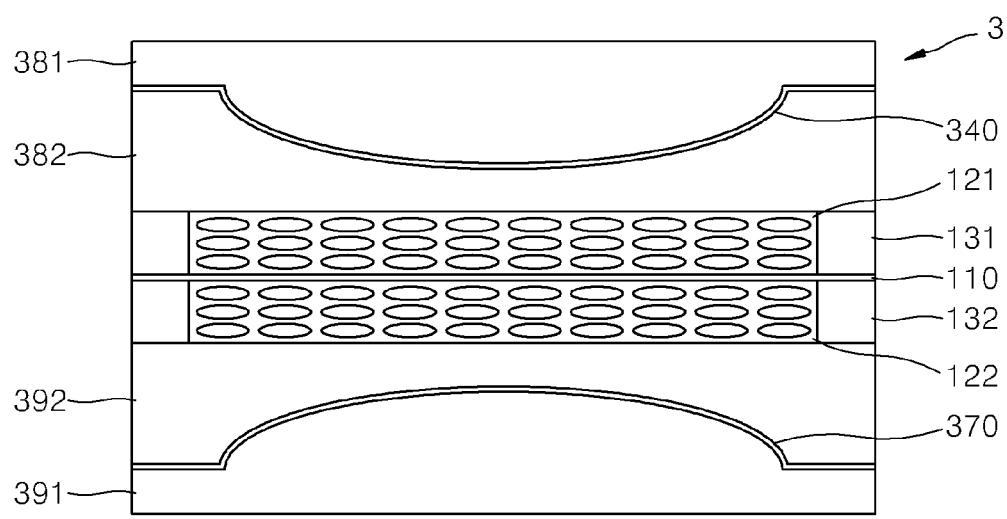
FIG. 4 is a cross-sectional view of a varifocal lens according to another exemplary embodiment

FIG. 4 is a cross-sectional view of a varifocal lens 3 according to another exemplary embodiment.

The varifocal lens 3 according to the present embodiment is different from the varifocal lens 100 of FIG. 1 in terms of curved shapes of a first electrode 340 and a second electrode 370. The curved shapes of the first electrode 340 and the second electrode 370 are convex toward the first liquid crystal layer 121 and the second liquid crystal layer 122, respectively. Due to the curved shapes of the first electrode 340 and the second electrode 370, a lower surface of a first upper substrate 381 and an upper surface of a second upper substrate 382 correspond to shapes of the two surfaces of the first electrode 340, respectively, and an upper surface of a first lower substrate 391 and a lower surface of a second lower substrate 392 correspond to shapes of the two shapes of the second electrode 370, respectively.

Figure 5:
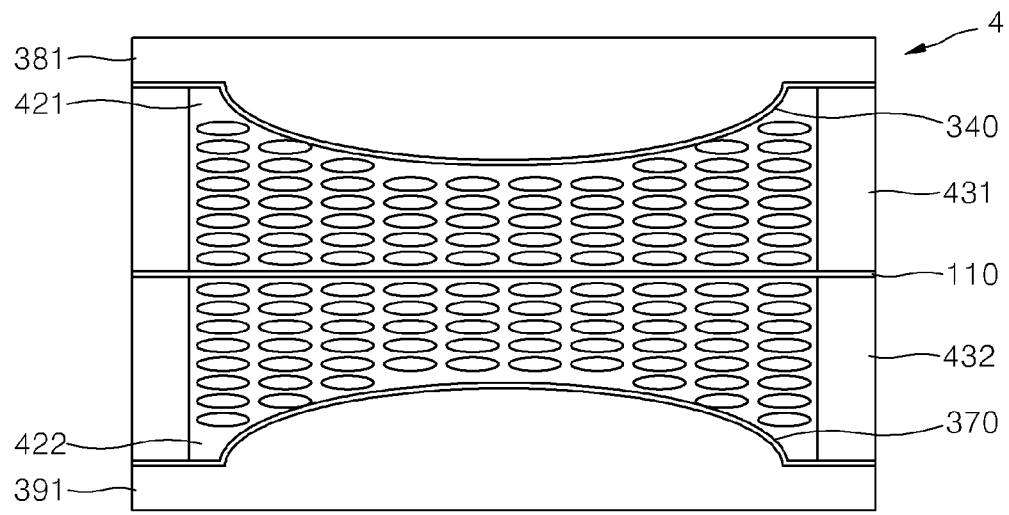
FIG. 5 is a cross-sectional view of a varifocal lens according to another exemplary embodiment.

FIG. 5 is a cross-sectional view of a varifocal lens 4 according to another exemplary embodiment.

The varifocal lens 4 according to the present embodiment is different from the varifocal lens 3 of FIG. 4 in that the varifocal lens 4 does not include a second upper substrate and a second lower substrate. That is, the first electrode 340 is disposed on the lower surface of the first upper substrate 381, the second electrode 370 is disposed on the upper surface of the first lower substrate 391, a first liquid crystal layer 421 is disposed between the first electrode 340 and the common electrode 110, and a second liquid crystal layer 422 is disposed between the common electrode 110 and the second electrode 370. The varifocal lens 4 may further include a first spacer 431 for encapsulating the first liquid crystal layer 421 and a second spacer 432 for encapsulating the second liquid crystal layer 422.

Figure 6:
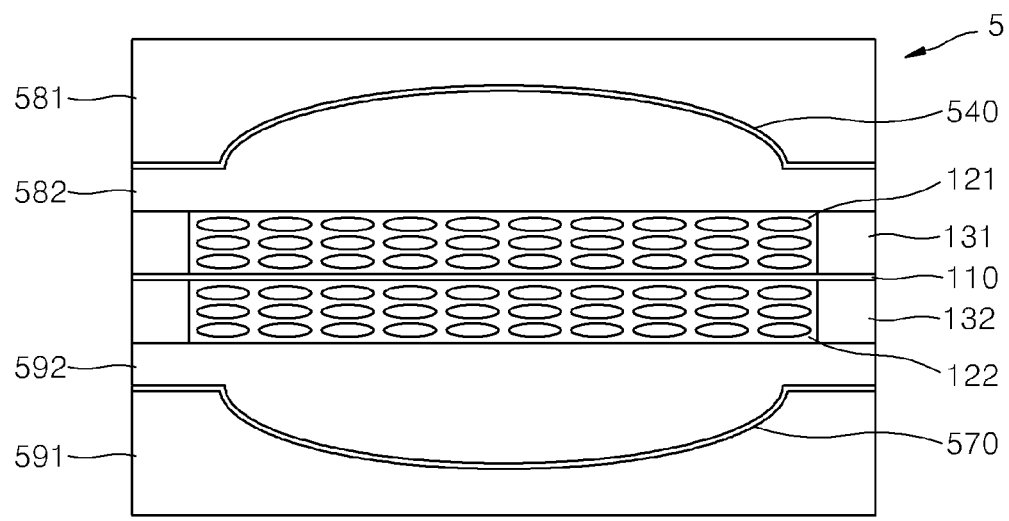
FIG. 6 is a cross-sectional view of a varifocal lens according to another exemplary embodiment.

FIG. 6 is a cross-sectional view of a varifocal lens 5 according to another exemplary embodiment.

The varifocal lens 5 according to the present embodiment is different from the varifocal lens 3 of FIG. 4 in terms of curved shapes of a first electrode 540 and a second electrode 570. The curved shapes of the first electrode 540 and the second electrode 570 are concave toward the first liquid crystal layer 121 and the second liquid crystal layer 122, respectively. Due to the curved shapes of the first electrode 540 and the second electrode 570, a lower surface of a first upper substrate 581 and an upper surface of a second upper substrate 582 correspond to shapes of the two surfaces of the first electrode 540, respectively, and an upper surface of a first lower substrate 591 and a lower surface of a second lower substrate 592 correspond to shapes of the two shapes of the second electrode 570, respectively. The varifocal lens 5 may further include a first spacer 131 for encapsulating the first liquid crystal layer 121 and a second spacer 132 for encapsulating the second liquid crystal layer 122.

Figure 7:
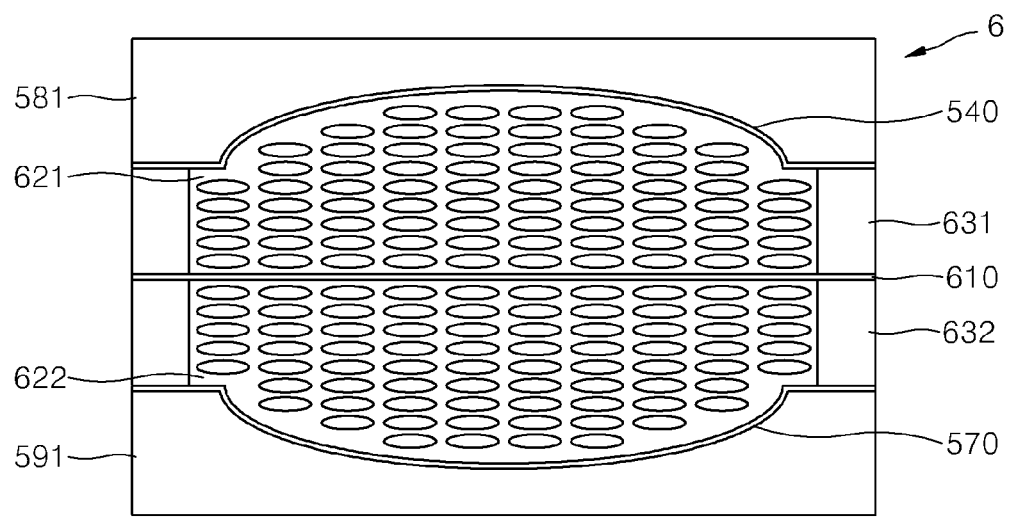
FIG. 7 is a cross-sectional view of a varifocal lens according to another exemplary embodiment.

FIG. 7 is a cross-sectional view of a varifocal lens 6 according to another exemplary embodiment.

The varifocal lens 6 according to the present embodiment is different from the varifocal lens 3 of FIG. 4 in that the varifocal lens 6 does not include a second upper substrate and a second lower substrate. That is, the first electrode 540 is disposed on the lower surface of the first upper substrate 581, the second electrode 570 is disposed on the upper surface of the first lower substrate 591, a first liquid crystal layer 621 is disposed between the first electrode 540 and a common electrode 610, and a second liquid crystal layer 622 is disposed between the common electrode 610 and the second electrode 570. The varifocal lens 6 may further include a first spacer 631 for encapsulating the first liquid crystal layer 621 and a second spacer 632 for encapsulating the second liquid crystal layer 622.

Figure 8:
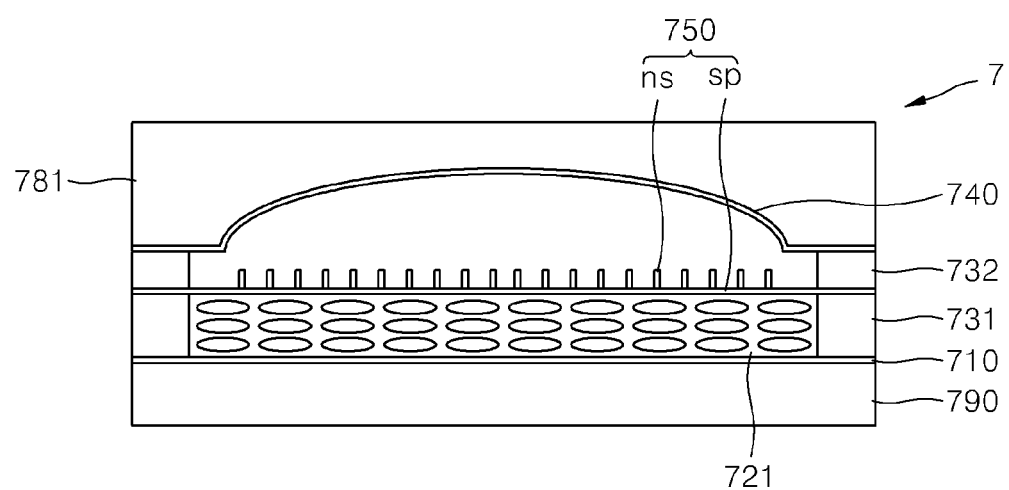
FIG. 8 is a cross-sectional view of a varifocal lens according to another exemplary embodiment.

FIG. 8 is a cross-sectional view of a varifocal lens 7 according to another exemplary embodiment.

The varifocal lens 7 includes a first liquid crystal layer 721, a common electrode 710 disposed below the first liquid crystal layer 721, a first electrode 740 disposed above the first liquid crystal layer 721 and having a curved shape, and a first nano structure layer 750 disposed between the first electrode 740 and the first liquid crystal layer 721 and including a plurality of nano structures 'ns'.

The first liquid crystal layer 721 is disposed on a substrate 790 on which the common electrode 710 is formed. The varifocal lens 7 may further include a first spacer 731 for encapsulating the first liquid crystal layer 721 and a second spacer 732 for encapsulating a space in which the first nano structure layer 750 is disposed.

A curved shape of the first electrode 740 is concave toward the first liquid crystal layer 721. In addition, a first upper substrate 781 has an upper surface having a flat shape and a lower surface having a curved surface corresponding to an upper surface of the first electrode 740.

The first nano structure layer 750 may include the plurality of nano structures 'ns' that are fixed on a support membrane 'sp'. The nano structures 'ns' may each include, for example, any one of carbon nanotube (CNT), metal nanowire, ZnO nanowire, and Si nanowire. The first nano structure layer 750 is formed to form a nonuniform electric field in the first liquid crystal layer 721 using a property that a nano structure maximizes a field effect. The nano structures 'ns' may have a uniform or non-uniform length distribution that is not limited to the case shown in FIG. 8.

Figure 9:
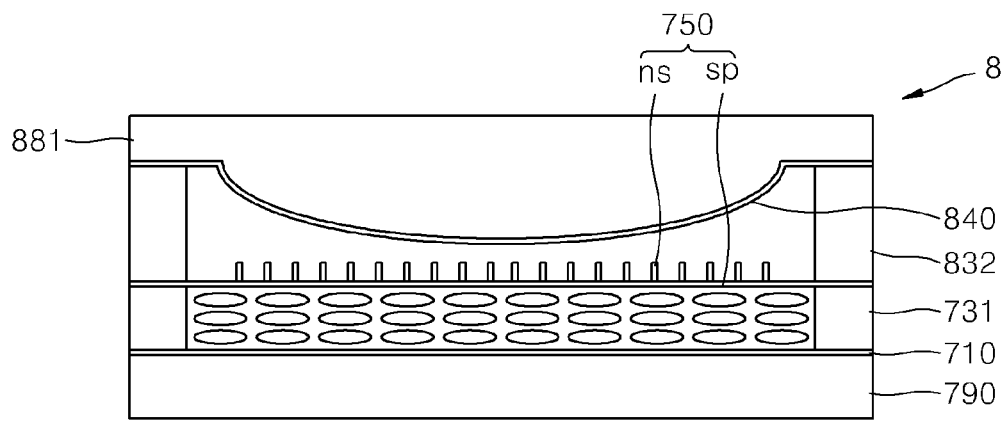
FIG. 9 is a cross-sectional view of a varifocal lens according to another exemplary embodiment.

FIG. 9 is a cross-sectional view of a varifocal lens 8 according to another exemplary embodiment.

The varifocal lens 8 according to the present embodiment is different from the varifocal lens 7 of FIG. 8 in terms of a curved shape of a first electrode 840. That is, the shape of the first electrode 840 is convex toward the first liquid crystal layer 721 so that a lower surface of a first upper substrate 881 may have a curved shape corresponding to the curved shape of the first electrode 840.

Figure 10:
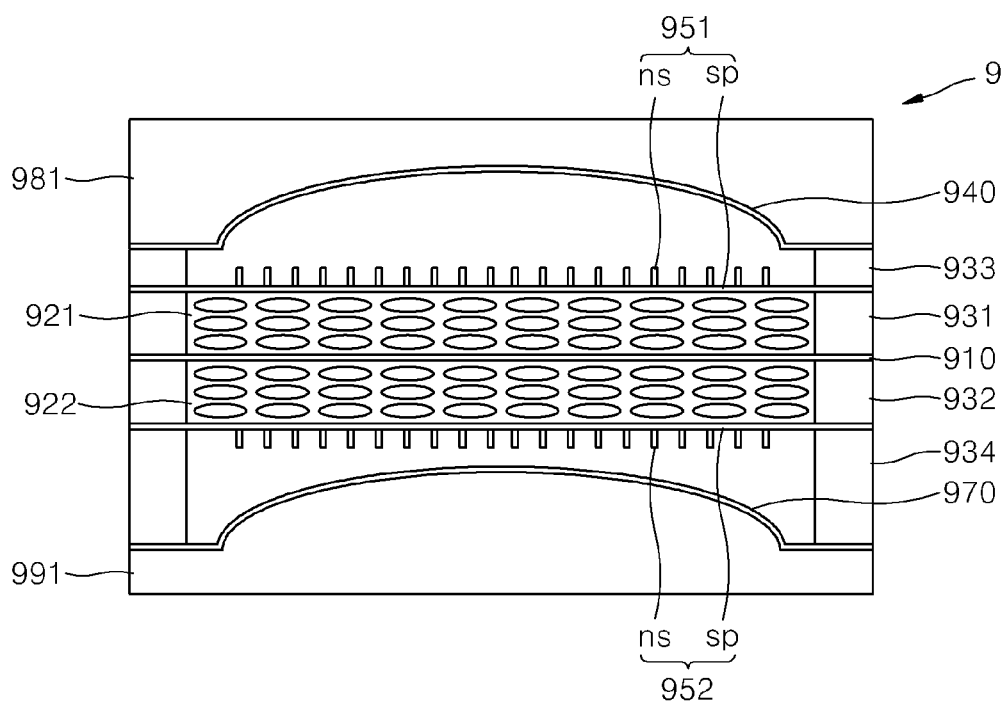
FIG. 10 is a cross-sectional view of a varifocal lens according to another exemplary embodiment.

FIG. 10 is a cross-sectional view of a varifocal lens 9 according to another exemplary embodiment.

The varifocal lens 9 according to the present embodiment includes a first liquid crystal layer 921 and a second liquid crystal layer 922 that are independently driven and includes a first nano structure layer 951 and a second nano structure layer 952 in order to effectively control an electric field that is formed in the first liquid crystal layer 921 and the second liquid crystal layer 922.

That is, the first liquid crystal layer 921 is disposed above a common electrode 910, the first nano structure layer 951 is disposed above the first liquid crystal layer 921, and a first electrode 940 having a curved shape and a first upper substrate 981 having a lower surface having a curved shape corresponding to the curved shape of the first electrode 940 are disposed above the first nano structure layer 951.

The second liquid crystal layer 922 is disposed below the common electrode 910, the second nano structure layer 952 is disposed below the second liquid crystal layer 922, and a second electrode 970 having a curved shape and a first lower substrate 991 having an upper surface having a curved shape corresponding to the curved shape of the second electrode 970 are disposed below the second nano structure layer 952.

The varifocal lens 9 may further include a first spacer 931 for encapsulating the first liquid crystal layer 921, a second spacer 933 for encapsulating a space in which the first nano structure layer 951 is disposed, a third spacer 932 for encapsulating the second liquid crystal layer 922, and a fourth spacer 934 for encapsulating a space in which the second nano structure layer 952 is disposed.

The curved shape of the first electrode 940 is concave toward the first liquid crystal layer 921 and the curved shape of the second electrode 970 is convex toward the second liquid crystal layer 922.

Figure 11:
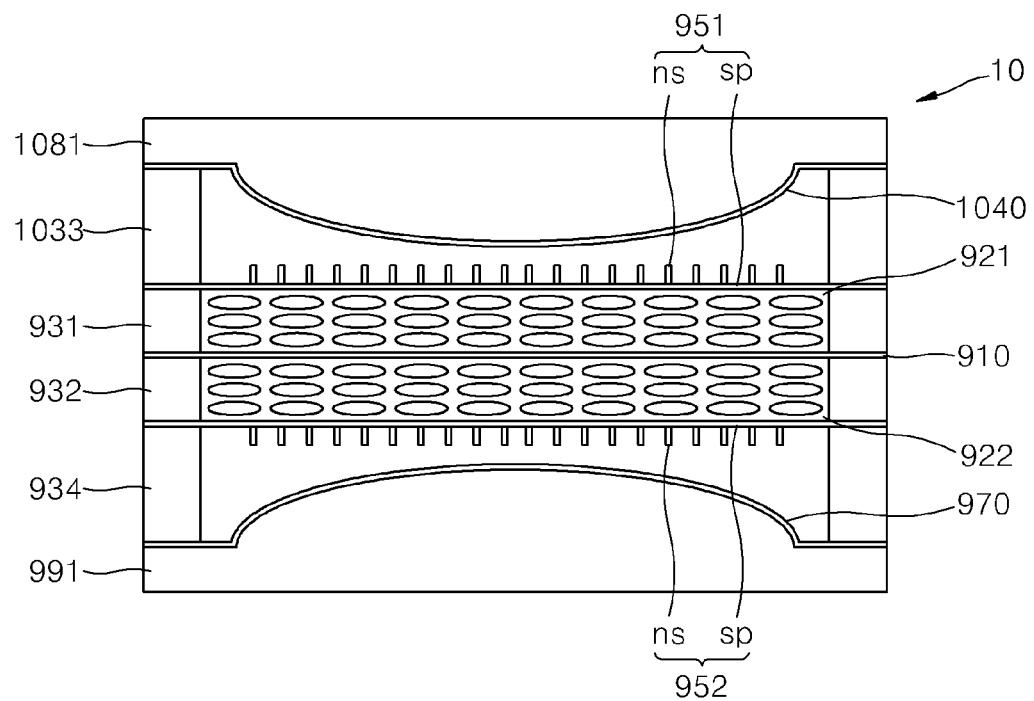
FIG. 11 is a cross-sectional view of a varifocal lens according to another exemplary embodiment.

FIG. 11 is a cross-sectional view of a varifocal lens 10 according to another exemplary embodiment.

The varifocal lens 10 according to the present embodiment is different from the varifocal lens 9 of FIG. 10 in terms of a curved shape of a first electrode 1040. The curved shape of the first electrode 1040 is convex toward the first liquid crystal layer 921 such that a lower surface of a first upper substrate 1081 may have a curved shape corresponding to the curved shape of the first electrode 1040. The varifocal lens 10 may further include third spacer 1033.

Figure 12:
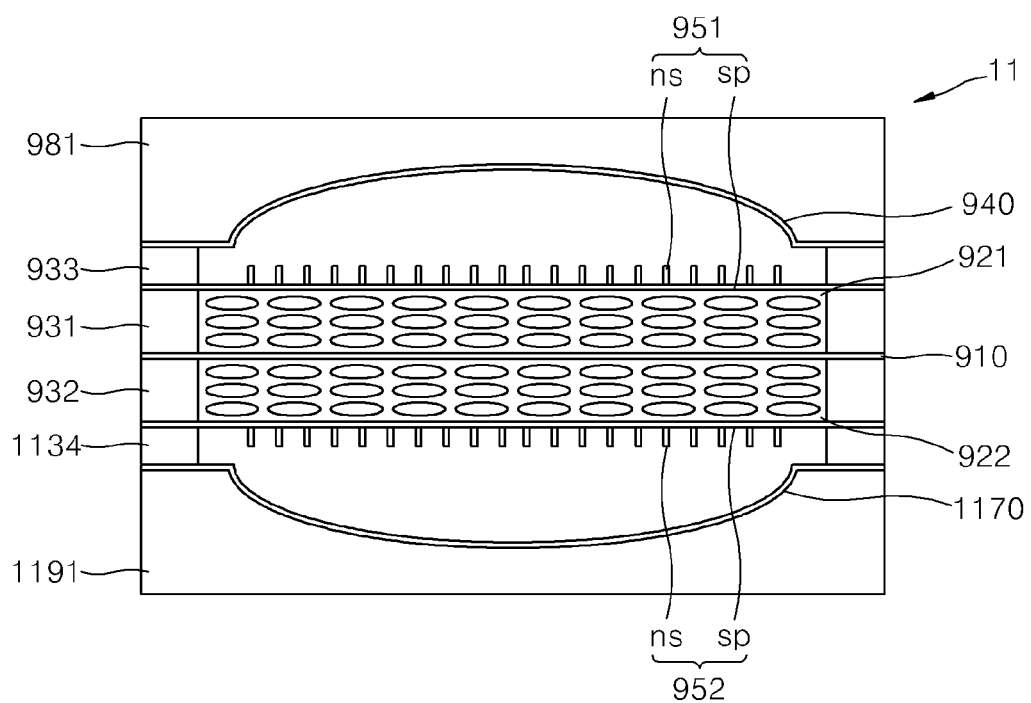
FIG. 12 is a cross-sectional view of a varifocal lens according to another exemplary embodiment.

FIG. 12 is a cross-sectional view of a varifocal lens 11 according to another exemplary embodiment.

The varifocal lens 11 according to the present embodiment is different from the varifocal lens 9 of FIG. 10 in terms of a curved shape of a second electrode 1170. The curved shape of the second electrode 1170 is concave toward the second liquid crystal layer 922 such that an upper surface of a first lower substrate 1191 may have a curved shape corresponding to the curved shape of the second electrode 1170. The varifocal lens 11 may further include fourth spacer 1134.

The above-described varifocal lens uses properties in that a refractive index of liquid crystal layer is changed according to a direction in which liquid crystal molecules are aligned and includes an electrode structures having a common electrode and two curve electrodes so as to form lens surfaces having various shapes in a liquid crystal layer.

Accordingly, a refractive index distribution may be precisely adjusted in the liquid crystal layer, thereby obtaining a precise variable focus.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A varifocal lens comprising:
   a first liquid crystal layer;
   a second liquid crystal layer disposed below the first liquid crystal layer;
   a common electrode disposed between the first liquid crystal layer and the second liquid crystal layer;
   a first electrode disposed above the first liquid crystal layer, the first electrode having a curved shape;
   a second electrode disposed below the second liquid crystal layer, the second electrode having a curved shape; and
   a first nano structure layer comprising a plurality of nano structures and disposed between the first electrode and the first liquid crystal layer to form a non-uniform electric field in the first liquid crystal layer, the first nano structure layer being spaced apart from the first electrode and the first liquid crystal layer,
   wherein the first liquid crystal layer is controlled by a voltage applied between the common electrode and the first electrode, and the second liquid crystal layer is controlled by a voltage applied between the common electrode and the second electrode.

2. The varifocal lens of claim 1, further comprising:
   a first upper substrate having a curved surface corresponding to an upper surface of the first electrode and disposed above the first liquid crystal layer, wherein the first electrode is disposed on a lower surface of the first upper substrate.

3. The varifocal lens of claim 2, further comprising:
   a second upper substrate that comprises a lower surface having a flat shape and an upper surface having a curved surface corresponding to a lower surface of the first electrode and is disposed above the first liquid crystal layer, wherein the first electrode is disposed between the first upper substrate and the second upper substrate.

4. The varifocal lens of claim 1, further comprising:
   a first lower substrate that comprises a lower surface having a flat shape and an upper surface having a curved surface corresponding to a lower surface of the second electrode and is disposed below the second liquid crystal layer, wherein the second electrode is disposed on the upper surface of the first lower substrate.

5. The varifocal lens of claim 4, further comprising:
a second lower substrate that comprises an upper surface having a flat shape and a lower surface having a curved surface corresponding to an upper surface of the second electrode, wherein the second electrode is disposed between the first lower substrate and the second lower substrate.

6. The varifocal lens of claim 1, further comprising:
a second nano structure layer comprising a plurality of nano structures and disposed between the second electrode and the second liquid crystal layer.

7. The varifocal lens of claim 6, wherein the plurality of nano structures comprise any one of carbon nanotube (CNT), metal nanowire, ZnO nanowire, and Si nanowire.

8. The varifocal lens of claim 1, wherein the common electrode comprises a plurality of electrodes that are spaced apart from each other and are arranged to have an overall flat structure.

9. The varifocal lens of claim 8, wherein the common electrode comprises a plurality of electrodes each having a fan shape and are spaced apart from each other to form a circular shape.

10. The varifocal lens of claim 1, wherein a surface of the first electrode is concave toward the first liquid crystal layer.

11. The varifocal lens of claim 10, wherein a surface of the second electrode is convex toward the second liquid crystal layer.

12. The varifocal lens of claim 10, wherein a surface of the second electrode is concave toward the second liquid crystal layer.

13. The varifocal lens of claim 1, wherein a surface of the first electrode is convex toward the first liquid crystal layer.

14. The varifocal lens of claim 13, wherein a surface of the second electrode is convex toward the second liquid crystal layer.

15. A varifocal lens comprising:
a first liquid crystal layer;
a common electrode disposed below the first liquid crystal layer;
a first electrode disposed above the first liquid crystal layer, the first electrode having a curved shape; and
a first nano structure layer disposed between the first electrode and the first liquid crystal layer to form a non-uniform electric field in the first liquid crystal layer, the first nano structure layer comprising a plurality of nano structures, the plurality of nano structures being aligned protruding in a direction away from the first liquid crystal layer and being spaced apart from each other.

16. The varifocal lens of claim 15, wherein a surface of the first electrode is convex toward the first liquid crystal layer.

17. The varifocal lens of claim 15, wherein a surface of the first electrode is concave toward the first liquid crystal layer.

18. The varifocal lens of claim 15, wherein the plurality of nano structures comprise any one of carbon nanotube (CNT), metal nanowire, ZnO nanowire, and Si nanowire.

* * * * *